(12) United States Patent
Mullenaux

(10) Patent No.: US 12,077,083 B2
(45) Date of Patent: Sep. 3, 2024

(54) WATER-DISPENSING SYSTEM FOR VEHICULAR CUPHOLDER

(71) Applicant: Thomas Mullenaux, San Pedro, CA (US)

(72) Inventor: Thomas Mullenaux, San Pedro, CA (US)

( * ) Notice: Subject to any disclaimer, the term of this patent is extended or adjusted under 35 U.S.C. 154(b) by 456 days.

(21) Appl. No.: 17/522,058

(22) Filed: Nov. 9, 2021

(65) Prior Publication Data

US 2022/0134931 A1    May 5, 2022

Related U.S. Application Data

(63) Continuation-in-part of application No. 17/380,178, filed on Jul. 20, 2021, now Pat. No. 11,738,986, and a continuation-in-part of application No. 16/695,416, filed on Nov. 26, 2019, now abandoned.

(51) Int. Cl.
  *B60N 3/18*    (2006.01)
  *B60N 3/10*    (2006.01)
(52) U.S. Cl.
  CPC .............. *B60N 3/18* (2013.01); *B60N 3/101* (2013.01)
(58) Field of Classification Search
  None
  See application file for complete search history.

(56) References Cited

U.S. PATENT DOCUMENTS

| | | | | |
|---|---|---|---|---|
| 3,276,634 A | * | 10/1966 | Arnot | B60N 3/16 219/202 |
| 3,675,442 A | * | 7/1972 | Swanson | C02F 1/10 62/93 |
| 3,745,596 A | | 7/1973 | Copeland | |
| 3,846,867 A | * | 11/1974 | Bryant | B60S 1/62 15/250.002 |
| 4,055,279 A | * | 10/1977 | Lapera | B60N 3/18 219/202 |
| 4,274,390 A | * | 6/1981 | Azuma | B60N 3/16 237/12.3 B |
| 5,090,075 A | | 2/1992 | Larson | |
| 5,106,512 A | * | 4/1992 | Reidy | C02F 1/18 95/24 |
| 5,190,025 A | * | 3/1993 | Chen | F24H 1/18 122/15.1 |
| 5,261,254 A | * | 11/1993 | Cattane | B60H 1/32331 15/250.1 |
| D342,393 S | | 12/1993 | Discepolo | |

(Continued)

*Primary Examiner* — Robert J Popovics

(57) ABSTRACT

The water-dispensing system for vehicular cup holder comprises a water provisioning system and a water dispensing system. The current disclosure is configured for use with a vehicle. The current disclosure mounts in the vehicle. The water provisioning system condenses condensate water from the atmosphere. The water provisioning system processes the condensate water into drinking water. The water provisioning system stores the drinking water in anticipation of consumption. The water dispensing system pumps the stored drinking water into a plurality of refillable drinking vessels. The water dispensing system monitors the level of the drinking water in each individual refillable drinking vessel selected from the plurality of refillable drinking vessels. The water dispensing system maintains a predetermined level of drinking water within each individual refillable drinking vessel.

3 Claims, 10 Drawing Sheets

(56) References Cited

U.S. PATENT DOCUMENTS

| | | | |
|---|---|---|---|
| 5,271,837 A | 12/1993 | Discepolo | |
| 5,435,151 A * | 7/1995 | Han | B01D 1/0017 62/239 |
| 5,497,918 A * | 3/1996 | Brilanchik | B67D 1/0004 123/41.31 |
| 5,651,259 A * | 7/1997 | Twyman | B60S 1/50 62/93 |
| 6,076,706 A * | 6/2000 | Kritchman | B60H 1/00285 222/481.5 |
| 6,209,573 B1 * | 4/2001 | Chau | F16K 31/22 137/340 |
| 6,460,361 B1 * | 10/2002 | Faria | B60N 3/18 62/394 |
| 6,513,343 B2 | 2/2003 | Pahl | |
| 6,868,690 B2 * | 3/2005 | Faqih | C02F 9/20 62/93 |
| 7,036,314 B2 * | 5/2006 | Hoffjann | B64D 11/02 60/648 |
| 7,089,763 B2 * | 8/2006 | Forsberg | F24F 1/027 62/635 |
| 7,108,094 B2 * | 9/2006 | Daniels | B60N 3/18 222/61 |
| 8,252,174 B2 * | 8/2012 | Jones | C02F 1/048 62/181 |
| 8,683,821 B2 * | 4/2014 | Volk | F24F 13/222 62/291 |
| 8,865,002 B2 * | 10/2014 | Weigle | B60S 1/50 137/59 |
| 9,469,422 B2 * | 10/2016 | Lasnier | B65B 3/10 |
| 9,517,923 B2 * | 12/2016 | Al-Hakim | B67D 1/10 |
| 9,751,744 B2 * | 9/2017 | Grottini | B67D 3/0006 |
| 9,751,745 B2 * | 9/2017 | Grottini | B67D 1/0801 |
| 10,155,492 B2 * | 12/2018 | Felix Frias | B60R 16/08 |
| 10,405,670 B1 * | 9/2019 | Mullenaux | B67D 1/0014 |
| 10,442,405 B2 * | 10/2019 | Weigle | B60S 1/488 |
| 10,480,163 B2 * | 11/2019 | Dudar | B60N 3/16 |
| 10,513,213 B1 * | 12/2019 | Mullenaux | B67D 1/0858 |
| 10,569,728 B2 * | 2/2020 | Martin | B60L 8/003 |
| 10,626,581 B1 * | 4/2020 | Mullenaux | B67D 1/08 |
| 10,710,863 B2 * | 7/2020 | Casci | B67D 1/10 |
| 10,844,774 B2 * | 11/2020 | Martin | G05D 1/0088 |
| 10,913,414 B2 * | 2/2021 | Martin | F16D 65/847 |
| 10,994,978 B1 * | 5/2021 | Mullenaux | B60N 3/18 |
| 11,066,286 B1 * | 7/2021 | Mullenaux | A47C 19/022 |
| 11,371,224 B2 * | 6/2022 | Mullenaux | B01D 5/009 |
| 11,427,458 B2 * | 8/2022 | Mullenaux | B67D 1/0007 |
| 11,472,687 B2 * | 10/2022 | Mullenaux | B67D 1/0085 |
| 11,512,010 B2 * | 11/2022 | Acre | C02F 1/002 |
| 11,566,831 B2 * | 1/2023 | Mullenaux | C02F 1/003 |
| 11,667,507 B2 * | 6/2023 | Mullenaux | A47G 19/2205 141/6 |
| 11,672,367 B2 * | 6/2023 | Mullenaux | B65D 1/06 141/113 |
| 11,730,312 B2 * | 8/2023 | Mullenaux | B01D 53/265 99/293 |
| 11,738,986 B2 * | 8/2023 | Mullenaux | B67D 1/0894 141/113 |
| 11,878,619 B2 * | 1/2024 | Acre | A61L 2/24 |
| 11,904,816 B2 * | 2/2024 | Andre-Masse | B01D 21/0006 |
| 11,919,764 B2 * | 3/2024 | Mullenaux | B60R 16/08 |
| 11,932,527 B2 * | 3/2024 | Mullenaux | B67D 1/1277 |
| 2004/0040322 A1 * | 3/2004 | Engel | E03B 3/28 62/177 |
| 2004/0237561 A1 * | 12/2004 | Duarte Barreto Junior | B60H 1/3233 62/291 |
| 2006/0169649 A1 * | 8/2006 | Hsueh | C02F 1/50 210/764 |
| 2009/0084728 A1 * | 4/2009 | Kirts | B01D 53/263 34/80 |
| 2010/0025311 A1 * | 2/2010 | Jones | C02F 1/048 222/173 |
| 2011/0089120 A1 * | 4/2011 | Weigle | B60S 1/50 210/744 |
| 2012/0103926 A1 * | 5/2012 | Ibsies | B65B 3/04 141/113 |
| 2013/0206266 A1 * | 8/2013 | Stenhouse | C02F 1/32 137/899.4 |
| 2016/0231029 A1 | 8/2016 | Pan | |
| 2018/0216319 A1 * | 8/2018 | Dudar | B67D 7/76 |
| 2019/0270419 A1 * | 9/2019 | Martin | F16D 65/847 |
| 2019/0291665 A1 * | 9/2019 | Martin | B60L 58/12 |
| 2021/0107435 A1 * | 4/2021 | Andre-Masse | B01D 29/11 |
| 2021/0283529 A1 * | 9/2021 | Mullenaux | B67D 1/0085 |
| 2021/0301506 A1 * | 9/2021 | Mullenaux | C02F 1/283 |
| 2022/0133067 A1 * | 5/2022 | Mullenaux | B67D 1/0888 220/703 |
| 2022/0134931 A1 * | 5/2022 | Mullenaux | B60N 3/18 137/351 |
| 2022/0135391 A1 * | 5/2022 | Mullenaux | B67D 1/1277 222/54 |
| 2022/0135431 A1 * | 5/2022 | Mullenaux | C02F 1/008 96/409 |
| 2022/0136219 A1 * | 5/2022 | Mullenaux | E03D 1/26 4/353 |
| 2022/0257047 A1 * | 8/2022 | Mullenaux | A47J 31/468 |
| 2022/0258068 A1 * | 8/2022 | Mullenaux | B01D 5/009 |
| 2022/0259027 A1 * | 8/2022 | Mullenaux | B67C 3/2631 |
| 2022/0259028 A1 * | 8/2022 | Mullenaux | B67D 1/124 |
| 2022/0259032 A1 * | 8/2022 | Mullenaux | B67D 1/0004 |
| 2022/0259033 A1 * | 8/2022 | Mullenaux | B67D 1/0894 |
| 2022/0259034 A1 * | 8/2022 | Mullenaux | B67D 1/124 |
| 2022/0281419 A1 * | 9/2022 | Raviv | B60S 1/50 |
| 2022/0335771 A1 * | 10/2022 | Mullenaux | B67D 1/0888 |
| 2022/0408690 A1 * | 12/2022 | Mullenaux | B67D 1/0888 |
| 2022/0409455 A1 * | 12/2022 | Mullenaux | A47G 23/03 |
| 2022/0412627 A1 * | 12/2022 | Mullenaux | C02F 9/20 |

* cited by examiner

WATER-DISPENSING SYSTEM FOR VEHICULAR CUPHOLDER

CROSS REFERENCES TO RELATED APPLICATIONS

This non-provisional application claims priority under 35 USC 120 to United States non-provisional application U.S. Ser. No. 17/380,178 filed on Jul. 20, 2021, by the inventor: Thomas Mullenaux. This non-provisional application claims United States non-provisional application U.S. Ser. No. 17/380,178 in its entirety. This non-provisional application claims priority under 35 USC 120 to United States non-provisional application U.S. Ser. No. 16/695,416 filed on Nov. 26, 2019, by the inventor: Thomas Mullenaux. This non-provisional application claims United States non-provisional application U.S. Ser. No. 17/380,178 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of passenger vehicles and water dispensers, more specifically, a vehicular water-dispensing system.

SUMMARY OF INVENTION

The water-dispensing system for vehicular cup holder comprises a water provisioning system and a water dispensing system. The water-dispensing system for vehicular cup holder is configured for use with a vehicle. The water-dispensing system for vehicular cup holder mounts in the vehicle. The water provisioning system condenses condensate water from the atmosphere. The water provisioning system processes the condensate water into drinking water. The water provisioning system stores the drinking water in anticipation of consumption. The water dispensing system pumps the stored drinking water into a plurality of refillable drinking vessels. The water dispensing system monitors the level of the drinking water in each individual refillable drinking vessel selected from the plurality of refillable drinking vessels. The water dispensing system maintains a predetermined level of drinking water within each individual refillable drinking vessel.

These together with additional objects, features and advantages of the water-dispensing system for vehicular cup holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the water-dispensing system for vehicular cup holder in detail, it is to be understood that the water-dispensing system for vehicular cup holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water-dispensing system for vehicular cup holder.

It is therefore important that the claims be regarded as including such equivalent construction insofar as they do not depart from the spirit and scope of the water-dispensing system for vehicular cup holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
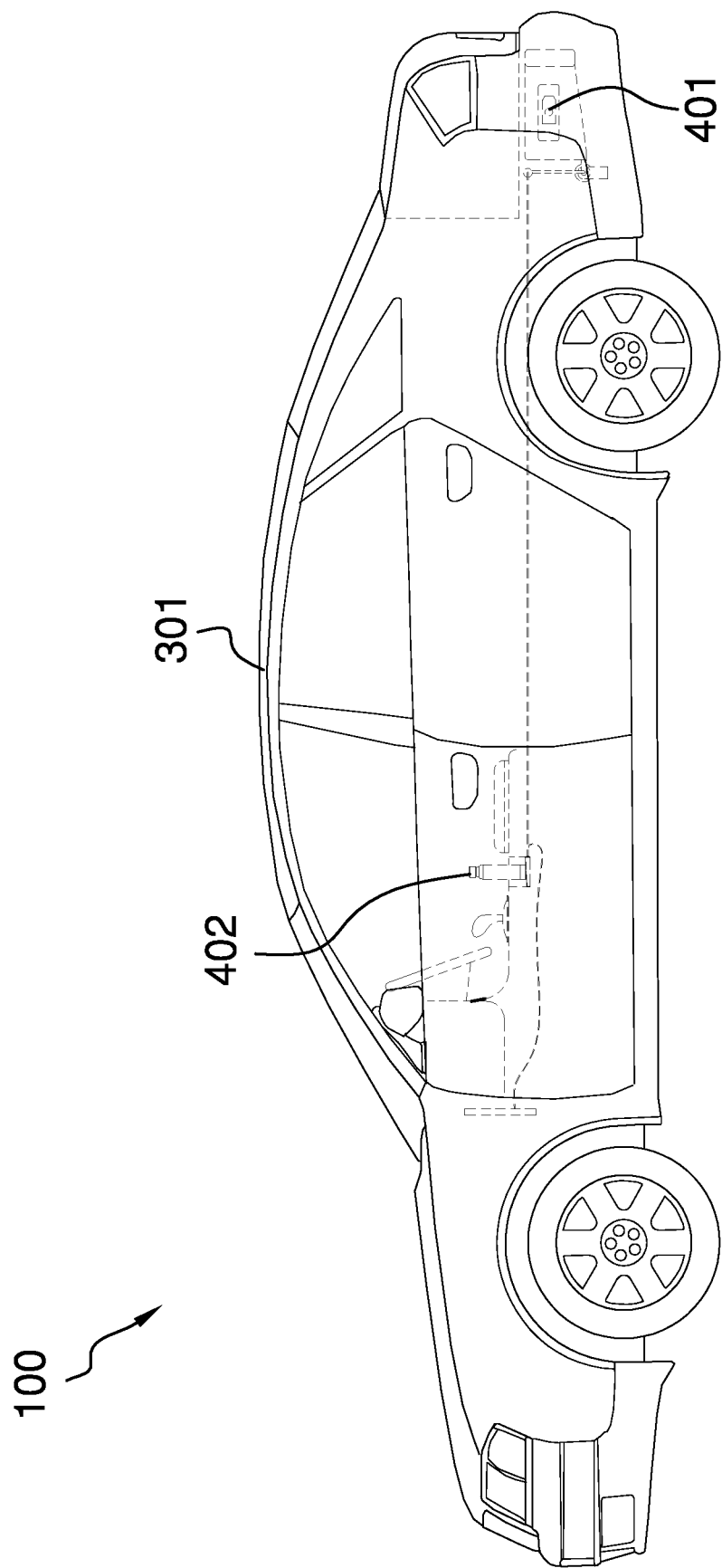
FIG. 1 is a side view of an embodiment of the disclosure.
Figure 2:
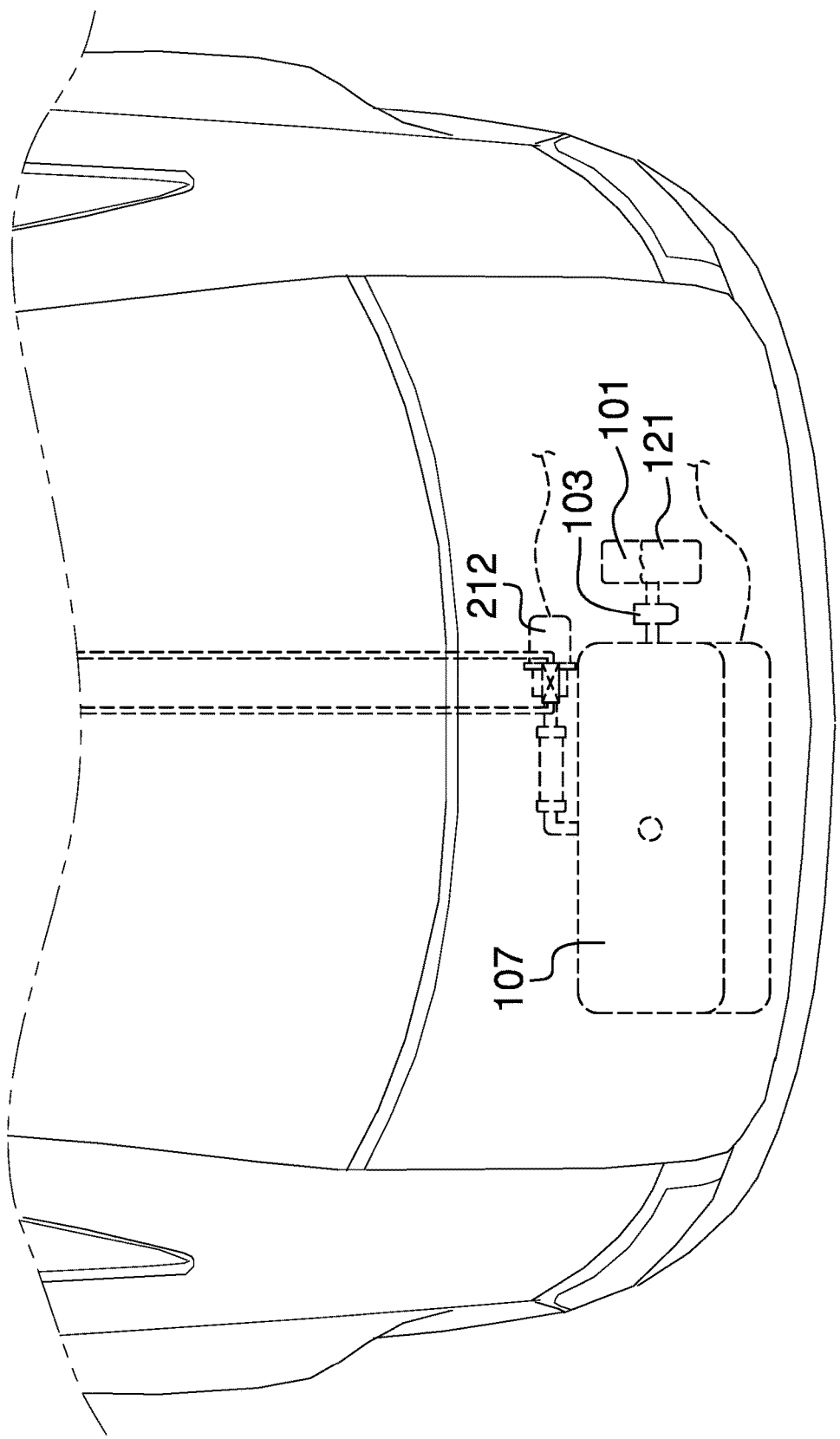
FIG. 2 is a top view of an embodiment of the disclosure.
Figure 3:
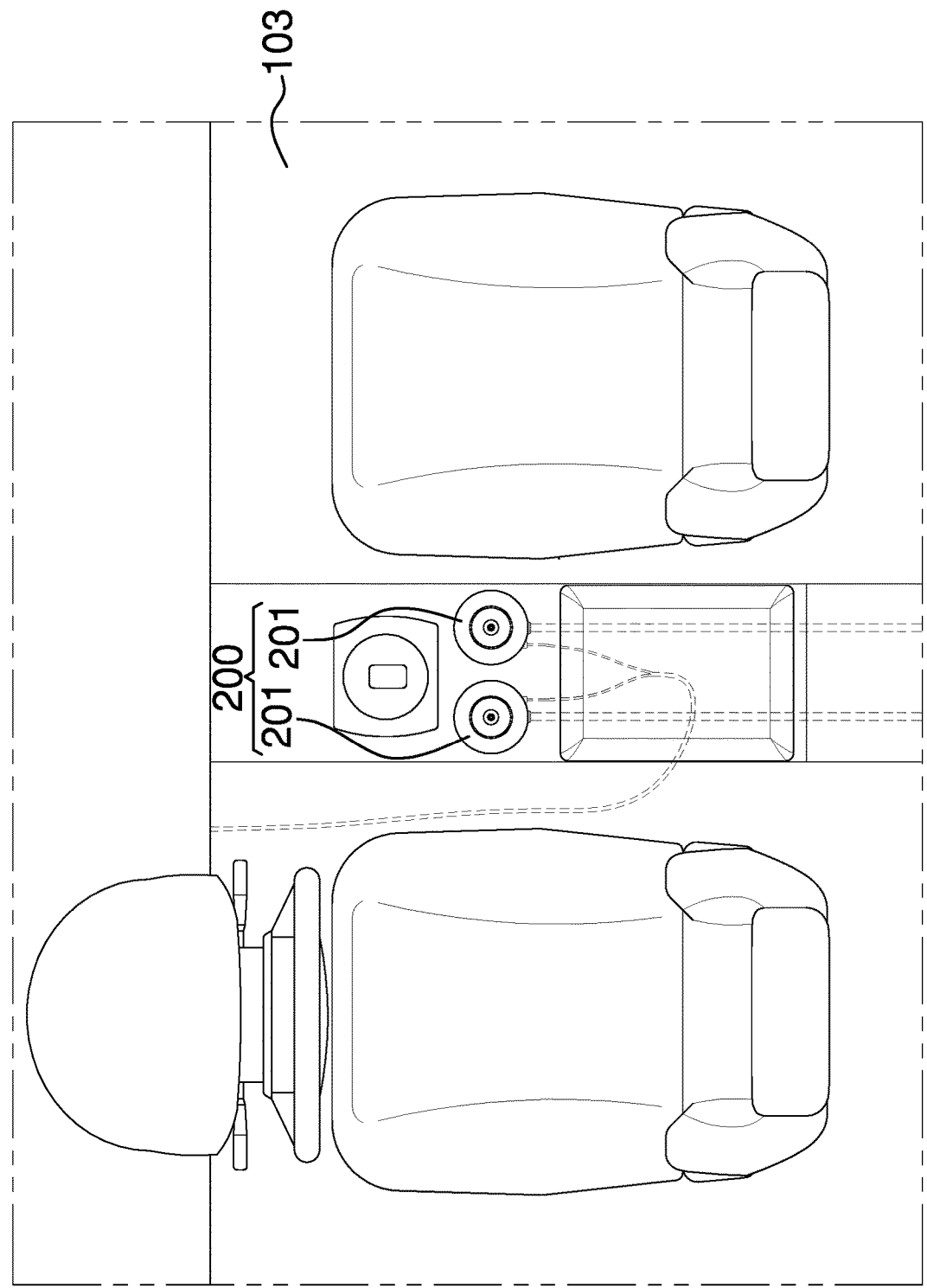
FIG. 3 is a top view of an embodiment of the disclosure.
Figure 4:
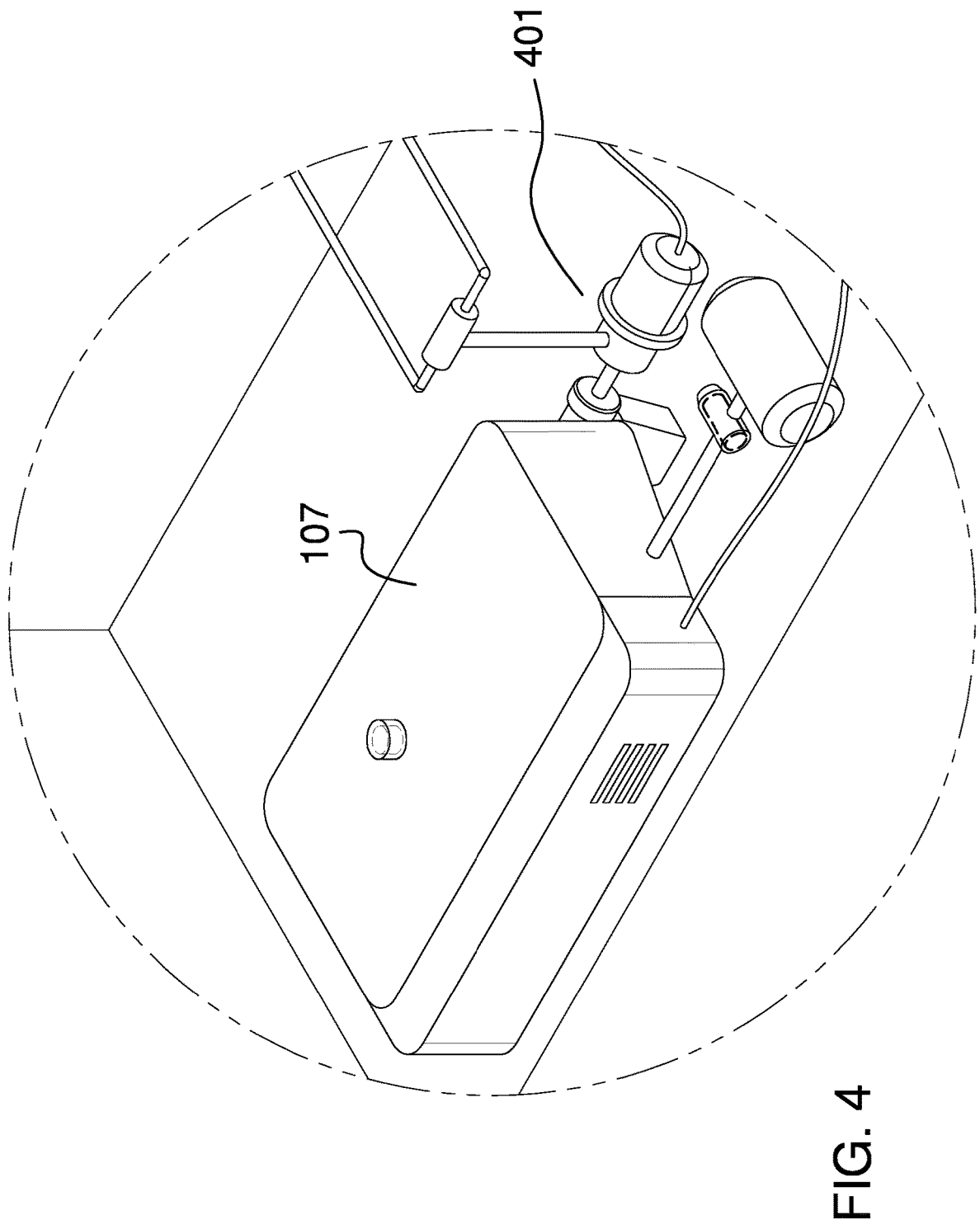
FIG. 4 is a detail view of an embodiment of the disclosure.
Figure 5:
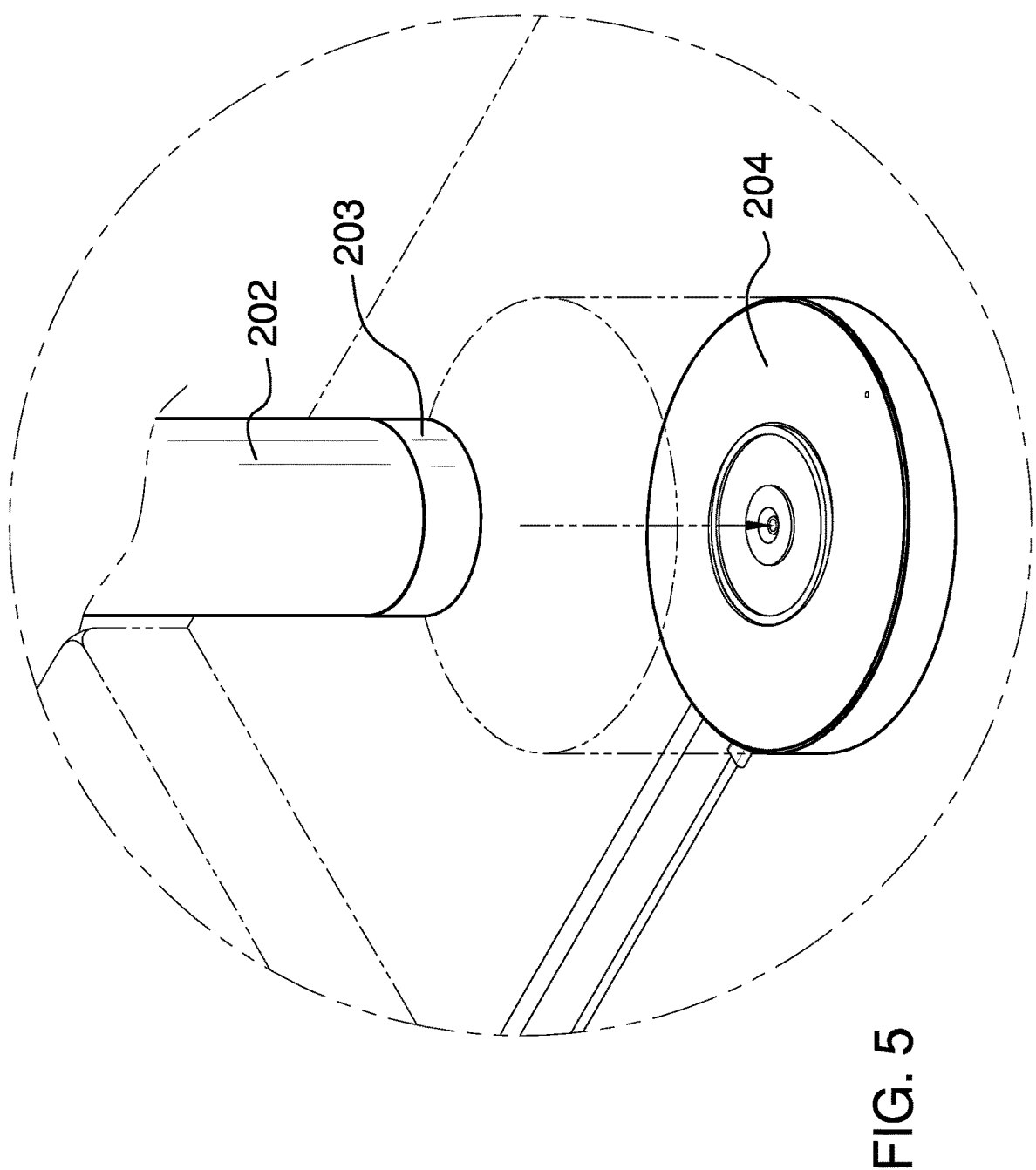
FIG. 5 is a detail view of an embodiment of the disclosure.
Figure 6:
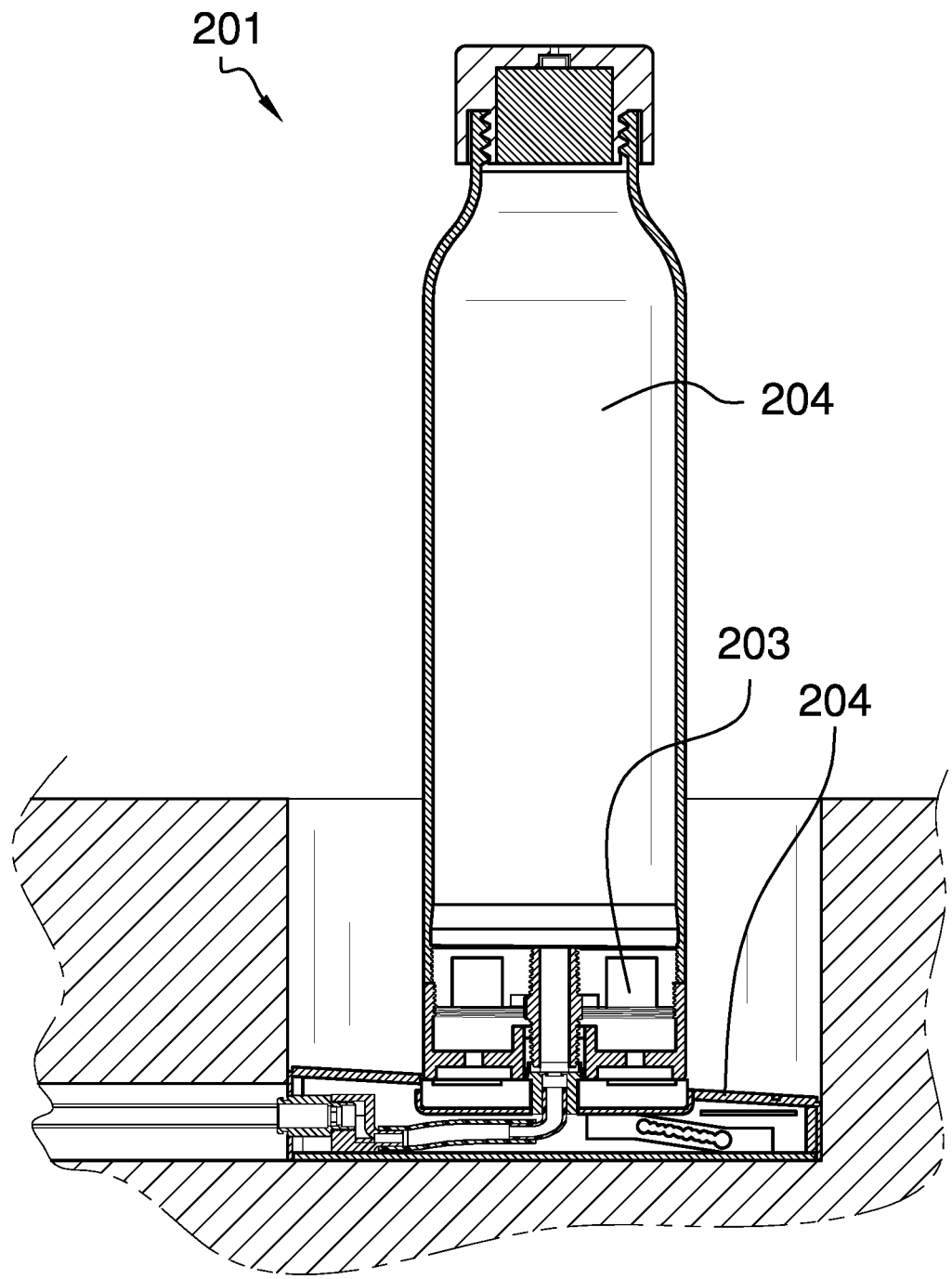
FIG. 6 is a detail view of an embodiment of the disclosure.
Figure 7:
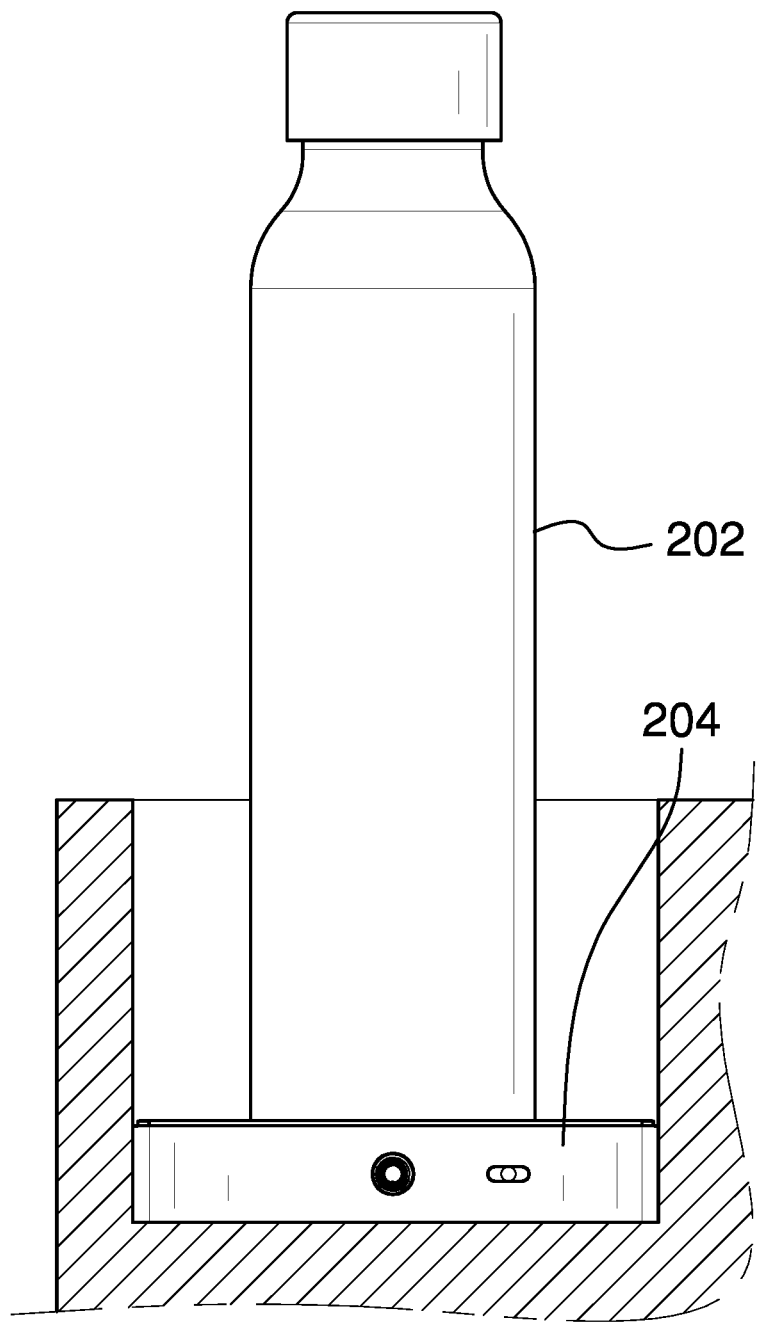
FIG. 7 is a detail view of an embodiment of the disclosure.
Figure 8:
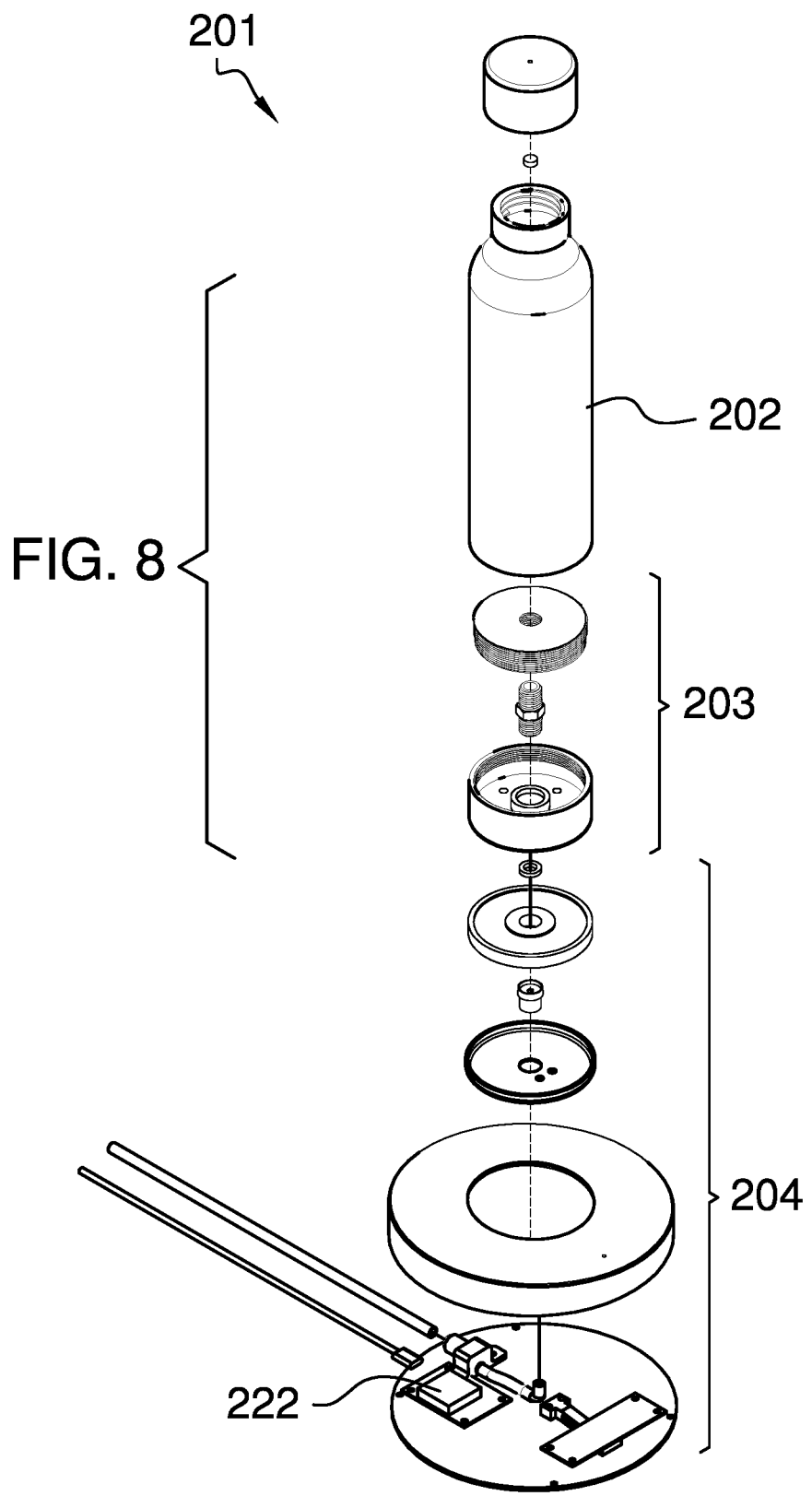
FIG. 8 is an exploded view of an embodiment of the disclosure.
Figure 9:
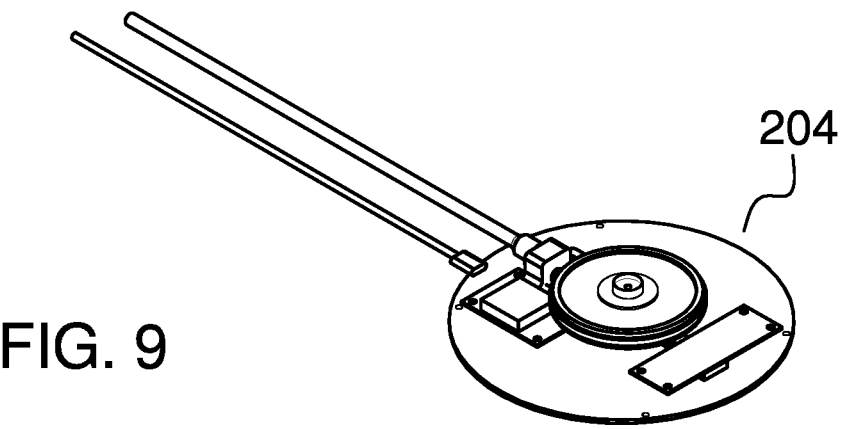
FIG. 9 is a detail view of an embodiment of the disclosure.
Figure 10:
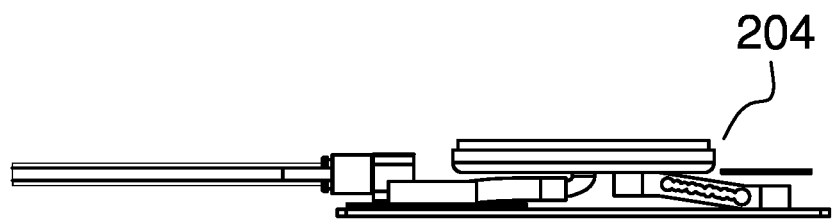
FIG. 10 is a detail view of an embodiment of the disclosure.
Figure 11:
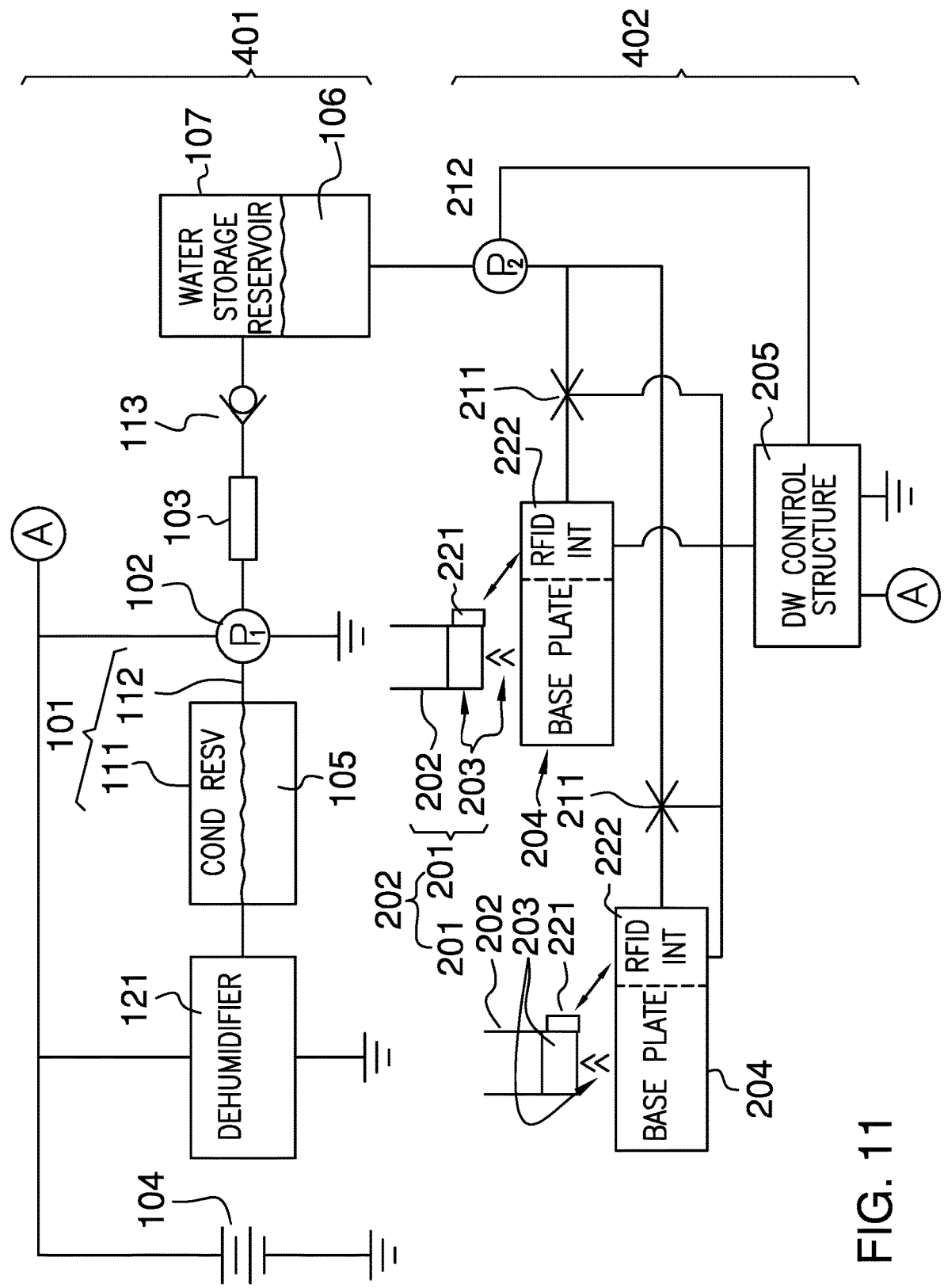
FIG. 11 is a schematic view of an embodiment of the disclosure.

Detailed reference will now be made to one or more potential embodiments of the disclosure, which are illustrated in FIGS. 1 through 11.

The water-dispensing system for vehicular cup holder 100 (hereinafter invention) comprises a water provisioning system 401 and a water dispensing system 402. The invention 100 is configured for use with a vehicle 301. The water provisioning system 401 and the water dispensing system 402 mount in and are operated from within the vehicle 301.

Each individual refillable drinking vessel 201 provides drinking water 106 to passengers within the vehicle 301. The water provisioning system 401 condenses water vapor in the atmosphere into condensate water 105. The water provisioning system 401 processes the condensate water 105 into drinking water 106. The water provisioning system 401 stores the drinking water 106 in anticipation of consumption. The water dispensing system 402 pumps the stored drinking water 106 into a plurality of refillable drinking vessels 200. The water dispensing system 402 monitors the level of the drinking water 106 in each individual refillable drinking vessel 201 selected from the plurality of refillable drinking vessels 200. The water dispensing system 402 maintains a predetermined level of drinking water 106 within each individual refillable drinking vessel 201.

The water provisioning system 401 comprises a water generation system 101, a condensate pump 102, a condensate filter 103, a power circuit 104, a water storage reservoir 107. The water generation system 101, the condensate pump 102 and the condensate filter 103 are fluidically connected. The water generation system 101 and the condensate pump 102 electrically connect to the power circuit 104. The water generation system and the condensate pump 102 receive electric energy from the power circuit 104.

The water generation system 101 is a mechanical system that condenses water vapor from the atmosphere into a liquid phase condensate water 105. The condensate water 105 is a source of water generated by the water generation system 101. The water generation system 101 further comprises a dehumidifier 121 and a condensate reservoir 111. The dehumidifier 121 and the condensate reservoir 111 are fluidically connected.

The dehumidifier 121 is a device that changes the phase of water vapor in the atmosphere into the liquid phase condensate water 105. The dehumidifier 121 is an electrically operated device that draws electrical energy from the power circuit 104. The use of a dehumidifier 121 is well-known and documented in the mechanical arts.

The condensate reservoir 111 is a containment structure. The condensate reservoir 111 collects condensate water 105 from the dehumidifier 121. The condensate reservoir 111 stores the condensate water 105 until the condensate pump 102 pumps the condensate water 105 through the condensate filter 103 and into the water storage reservoir 107.

The condensate reservoir 111 further comprises a condensate discharge port 112. The condensate discharge port 112 is a fluidic connection formed between the condensate reservoir 111 and the condensate pump 102. The condensate pump 102 draws the condensate water 105 out of the condensate reservoir 111 through the condensate discharge port 112 for transport into the fluid input of the condensate filter 103.

The condensate pump 102 is a mechanical device. The condensate pump 102 is an electrically powered device. The condensate pump 102 generates a pressure differential. The pressure differential generated by the condensate pump 102 transports the condensate water 105 from the condensate reservoir 111 and through the condensate filter 103 into the water storage reservoir 107. The condensate reservoir 111 controls the operation of the condensate pump 102 by controlling the operation of an electric motor that drives the condensate pump 102. The use of a pump is well-known and documented in the mechanical arts.

The condensate filter 103 is a filtering device. The condensate filter 103 filters the condensate water 105 as it passes through the condensate filter 103. The condensate filter converts the condensate water 105 into the drinking water 106 by removing impurities contained within the condensate filter 103. In the first potential embodiment of the disclosure, the condensate filter 103 is a bed filter that passes the condensate water 105 through a bed formed of activated carbon.

The condensate filter 103 further comprises a condensate check valve 113. The condensate check valve 113 forms a direct fluidic connection between the discharge port of the condensate filter 103 and the water storage reservoir 107. The condensate check valve 113 transports the drinking water 106 from the condensate filter 103 into the water storage reservoir 107. The condensate check valve 113 limits the direction of the flow of the drinking water 106 to the direction from the condensate filter 103 into the water storage reservoir 107.

The power circuit 104 is an electric circuit. The power circuit 104 provides the electric energy necessary to operate the water generation system 101, the condensate pump 102, and the water dispensing system 402. In the first potential embodiment of the disclosure, the power circuit 104 draws electric energy from the electric system of the vehicle 301.

The water storage reservoir 107 is a container that stores the drinking water 106. The water storage reservoir 107 forms a fluidic connection with the condensate filter 103. The water storage reservoir 107 receives drinking water 106 from the condensate filter 103.

The water dispensing system 402 comprises a plurality of refillable drinking vessels 200. The plurality of refillable drinking vessels 200 further comprises a collection of individual refillable drinking vessels 201.

Each individual refillable drinking vessel 201 further comprises a container structure 202, a container structure 202 fitting structure 203, a base plate 204, and a drinking water 106 control structure 205. The base plate 204 forms a fluidic connection between the container structure 202 fitting structure 203 and a discharge pump 212. The container structure 202 fitting structure 203 forms a fluidic connection between the container structure 202 and the base plate 204. The drinking water 106 control structure 205 automatically controls the flow of drinking water 106 from the discharge pump 212 through the base plate 204 and the container structure 202 fitting structure 203 into the container structure 202. The drinking water 106 control structure 205 senses when the container structure 202 is near the base plate 204. The drinking water 106 control structure 205 measures and controls the amount of drinking water 106 contained in the container structure 202.

The discharge pump 212 is a pump. The discharge pump 212 draws drinking water 106 out of the water storage reservoir 107 and pumps the drawn water into the base plate 204 of each individual refillable drinking vessel 201 selected from the plurality of refillable drinking vessels 200.

The container structure 202 is a drinking water 106 containment vessel. The container structure 202 stores drinking water 106 in anticipation of consumption. The container structure 202 is an enclosable structure. By enclosable structure is meant that the container structure 202 forms a fluid impermeable structure that encloses the drinking water 106 within the container structure 202.

The container structure 202 fitting structure 203 is an interface structure. The container structure 202 fitting structure 203 forms the fluidic connection between the base plate 204 and the container structure 202. The container structure 202 fitting structure 203 mounts on the container structure 202. The container structure 202 fitting structure 203 mechanically attaches to the base plate 204. The container structure 202 fitting structure 203 further comprises an RFID tracking tag 221.

The RFID tracking tag 221 mounts in the container structure 202 fitting structure 203. The RFID tracking tag 221 is an antenna. The RFID tracking tag 221 is a reflective structure. The RFID tracking tag 221 receives a radio frequency signal (known as an interrogation signal) from an RFID interrogator 222 mounted in the base plate 204. The RFID tracking tag 221 modifies the waveform of the received radio frequency signal. The RFID tracking tag 221 reflects the modified waveform back to the RFID interrogator 222 as a responding signal. The RFID tracking tag 221 is used by the drinking water 106 control structure 205 to identify the location of the container structure 202 fitting structure 203 relative to the base plate 204. The RFID tracking tag 221 is defined elsewhere in this disclosure.

The base plate 204 is a mechanical structure. The container structure 202 fitting structure 203 secures the container structure 202 to the base plate 204. The container structure 202 fitting structure 203 removably attaches to the base plate 204. The container structure 202 fitting structure 203 is magnetically secured to the base plate 204. The base plate 204 forms a pedestal that transfers the loads of the container structure 202 and the container structure 202 fitting structure 203 to the vehicle 301. The base plate 204 forms a detachable fluidic connection between the discharge pump 212 and the container structure 202 fitting structure 203. The drinking water 106 control structure 205 mounts in the base plate 204 of an individual refillable drinking vessel 201 selected from the plurality of refillable drinking vessels 200.

The drinking water 106 control structure 205 is a control system. The drinking water 106 control structure 205 confirms that the container structure 202 has a fluidic connection with the base plate 204. The drinking water 106 control structure 205 controls the flow of the drinking water 106 from the base plate 204 into the container structure 202 of each individual refillable drinking vessel 201 selected from the plurality of refillable drinking vessels 200. By controlling the flow of drinking water 106 into the container structure 202 is meant that the drinking water 106: a) monitors the mass of drinking water 106 within the container structure 202; b) initiates the flow of drinking water 106 into the container structure 202 when the mass of drinking water 106 falls below a predetermined mass; and, c) discontinues the flow of drinking water 106 into the container structure 202 when the drinking water 106 in the container structure 202 reaches the predetermined mass.

The drinking water 106 control structure 205 comprises a solenoid valve 211 for each individual refillable drinking vessel 201 selected from the plurality of refillable drinking vessels 200. The drinking water 106 control structure 205 electrically connects to each solenoid valve 211. The drinking water 106 control structure 205 electrically connects to the discharge pump 212.

The solenoid valve 211 is an electrically controlled valve. The solenoid valve 211 mounts in the base plate 204 of each individual refillable drinking vessel 201 selected from the plurality of refillable drinking vessels 200. The drinking water 106 control structure 205 controls the operation of the solenoid valve 211. The solenoid valve 211 forms a fluidic connection between the discharge pump 212 and the base plate 204. The solenoid valve 211 controls the flow of the drinking water 106 into the base plate 204.

The drinking water 106 control structure 205 controls the operation of the discharge pump 212. The discharge pump 212 generates the pressure differential required to transport drinking water 106 from the water storage reservoir 107 through the solenoid valve 211 into the base plate 104.

The base plate 204 of each individual refillable drinking vessel 201 selected from the plurality of refillable drinking vessels 200 further comprises an RFID interrogator 222. The drinking water 106 control structure 205 controls the operation of each the RFID interrogator 222. The RFID interrogator 222 interacts with the RFID tracking tag 221. The drinking water control structure 205 detects the presence of the RFID tracking tag 221 of the container structure 202 fitting structure 203 using the RFID interrogator 222.

The drinking water 106 control structure 205 measures the mass of the drinking water 106 in each individual refillable drinking vessel 201 selected from the plurality of refillable drinking vessels 200. The drinking water 106 control structure 205 opens the solenoid valve 211 to allow the flow of drinking water 106 into the base plate 204 when the mass of drinking water 106 in the flask selected individual refillable drinking vessel 201 falls below a predetermined mass. The drinking water 106 control structure 205 closes the solenoid valve 211 to discontinue the flow of drinking water 106 into the base plate 204 when the mass of drinking water 106 in the selected individual refillable drinking vessel 201 reaches the predetermined mass.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Antenna: As used in this disclosure, an antenna is an electrical apparatus used to: a) convert electrical current into electromagnetic radiation; and, b) convert electromagnetic radiation into electrical current. An antenna is a type of transducer.

Automatic: As used in this disclosure, automatic refers to a device, process, or a system that operates without human control, supervision, or participation in the operation of the device, process, or system. The verb form of automatic is to automate.

Ball: As used in this disclosure, a ball refers to an object with a spherical or nearly spherical shape.

Ball Check Valve: As used in this disclosure, a ball check valve is a type of check valve. A ball check valve is a valve that has a ball inserted into it such that the ball move freely within the valve structure. The flow of fluid applies a force to the ball check valve that provides the motive forces that move the ball within the valve structure. The ball check valve is structured such that the flow of a fluid through the ball check valve in a first direction presses the ball into the flow path of the fluid through the ball check valve such that the fluid will apply a pressure against the ball that closes the fluid flow path through the ball check valve in the first direction. The ball check valve is further structured such that the flow of a fluid through the ball check valve in a second direction pushes the ball out of the flow path of the ball check valve such that the ball check valve allows the flow of fluid in the second direction. The second direction is the opposite direction to the first direction.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Check Valve: As used in this disclosure, a check valve is a valve that permits the flow of fluid in a single direction. Within selected potential embodiments of this disclosure, the check valve is a commercially available product that is selected from the group consisting of a ball check valve, a Tesla valve, and a duck valve.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drinking Water: As used in this disclosure, drinking water is water that is deemed safe for drinking or use in cooking by humans. A synonym is potable water.

Duck Valve: As used in this disclosure, a duck valve is a check valve. The duck valve is formed from two or more elastomeric structures. When the two or more elastomeric structures are in their relaxed shape, the duck valve forms a seal. The seal is oriented such that a fluidic pressure differential in a first direction will separate the two or more elastomeric structures allowing the fluid to flow through the duck valve in the first directions. When the fluidic pressure differential is in a second direction that is opposite to the first direction, the fluidic pressure applies a pressure that maintains the two or more elastomeric structures in their relaxed shape and prevents the flow of fluid through the duck valve in the second direction. A duck valve derives its name from a commonly used shape of the two or more elastomeric structures. A duck valve is also called a silicone valve.

Electromagnet: As used in this disclosure, an electromagnet is a core formed from a magnetic material that has a coil formed from an electric current carrying conductor wrapped around it. When an electric current flows through the coil, the core exhibits magnetic properties when an electric current flows through the coil and exhibits no (or reduced) magnetic properties when electric current is not flowing through the coil.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Fitting: As used in this disclosure, a fitting is a component that attaches a first object to one or more additional objects. The fitting is often used to forming a fluidic connection between the first object and the one or more additional objects.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Humidity: As used in this disclosure, humidity refers water vapor that is dissolved in the atmosphere. The mass of water dissolved into the atmosphere is limited by the temperature of the atmosphere.

Interface: As used in this disclosure, an interface is a physical or virtual boundary that separates two different systems and across which occurs an exchange.

Interior: As used in this disclosure, the interior is used as a relational term that implies that an object is contained within the boundary of a structure or a space.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Mount: As used in this disclosure, a mount is a mechanical structure that attaches or incorporates a first object to a second object.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Phase Change Terminology: As used in this disclosure, the following terms are used to describe a phase change. A phase change from a solid phase to a liquid phase is called melting. A phase change from a liquid phase to a solid phase is called freezing or solidification. A phase change from a solid phase to a gas phase is called sublimation. A phase change from a gas phase to a solid phase is called deposition. A phase change from a liquid phase to a gas phase is called evaporation. A phase change from a gas phase to a liquid phase is called condensation. A phase change from a gas phase to a plasma phase is called ionization. A phase change from a plasma phase to a gas phase is called recombination.

Port: As used in this disclosure, a port is an opening formed in a first object that allows a second object to pass through a boundary formed by the first object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reservoir: As used in this disclosure, a reservoir refers to a container or containment system that is configured to store a liquid.

RFID: As used in this disclosure, RFID refers to Radio Frequency Identification technology. RFID is a wireless technology that uses an electromagnetic field to identify and retrieve data from tracking tags that are placed on or near an object.

RFID Interrogator: As used in this disclosure, an RFID interrogator is a device that transmits a radio signal at frequency designed to activate RFID tracking tags that are tuned to operate at that frequency; b) receives a modified reflected signal from each of the RFID tracking tags that were activated by the transmitted radio signal; c) decodes the information contained in the received modified reflected signal for each of the activated RFID tracking tag; and, d) forwards the decoded information to a designated device or process for subsequent processing.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port. A solenoid valve comprises a coil and a valve. The coil forms the solenoid that opens and closes the solenoid valve. The solenoid valve is a valve that opens and closes to control the fluid flow.

Solid: As used in this disclosure, a solid refers to a state (phase) of matter that: 1) has a fixed volume; and, 2) does not flow.

Tank: As used in this disclosure, a tank is an enclosed hollow structure used to store a fluid.

Tesla Valve: As used in this disclosure, a Tesla valve is a type of check valve that requires the use of no moving parts.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Valve: As used in this disclosure, a valve is a device that is used to control the flow of a fluid (gas or liquid) through a pipe, tube, or hose.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automobile capable of capturing water vapor in the atmosphere and delivering liquid water for consumption, comprising:
   a dehumidifier (121) for condensing atmospheric water vapor;
   a condensate reservoir (111) in fluid communication with the dehumidifier (121) for receipt of condensed water (105) condensed by the dehumidifier (121);
   a condensate pump (102) having an inlet in fluid communication with the condensate reservoir (111);
   a condensate filter (103) having an inlet in fluid communication with an outlet of the condensate pump (102);
   a water storage reservoir (107) in fluid communication with an outlet of the condensate filter (103) for receiving filtered condensate that has passed through the condensate filter (103);
   a condensate check valve (113) interposed in fluid communication between a discharge port of the condensate filter (103) and an inlet of the water storage reservoir (107) permitting flow only in the direction from the condensate filter (103) to the water storage reservoir (107);

a discharge pump (212) having inlet in fluid communication with the water storage reservoir (107) for pumping filtered condensate from the water storage reservoir (107);

a container structure (202) including a container fitting structure (203) and a base plate (204); and a drinking water (106) control structure (205) for automatically controlling the flow of drinking water (106) from the discharge pump (212) through the base plate (204) and the container structure (202) fitting structure (203) into the container structure (202) through an inlet at the bottom of the container structure (202), responsive to a measured mass of drinking water (106) within the container structure (202).

2. The automobile capable of capturing water vapor in the atmosphere and delivering liquid water for consumption of claim 1, further comprising:

a plurality of container structures (202) each including a container fitting structure (203) and a base plate (204).

3. The automobile capable of capturing water vapor in the atmosphere and delivering liquid water for consumption of claim 1, further comprising:

an RFID tracking tag (221) is mounted in the fitting structure (203); and an RFID interrogator (222) is mounted in the base plate (204);

wherein, the RFID tracking tag (221) receives a radio frequency signal from the RFID interrogator (222) to identify the location of the container structure (202) fitting structure (203) relative to the base plate (204).

\* \* \* \* \*